Patented July 24, 1928.

1,678,627

UNITED STATES PATENT OFFICE.

ALPHONS O. JAEGER, OF HAMBURG, NEW YORK, ASSIGNOR TO THE SELDEN COMPANY, OF PITTSBURGH, PENNSYLVANIA, A CORPORATION OF DELAWARE.

METHOD OF REGENERATING CATALYSTS.

No Drawing. Application filed August 3, 1925. Serial No. 48,002.

This invention relates to the regeneration or revivification of catalysts or catalytic contact masses which have partly or completely lost their catalytic activity or efficiency; and relates more particularly to a method of restoring more or less completely the catalytic activity of contact masses which are employed in the catalytic oxidation of organic substances.

It is well known that the contact masses employed in the catalytic oxidation of organic substances often lose upon use over a period of time more or less of their catalytic power and efficiency.

This may be illustrated, for example, in the known deterioration or depreciation of the catalytic activity which often occurs in contact masses employed in the catalytic oxidation of naphthalene to alphanaphthoquinone, phthalic anhydride or maleic acid, of benzene, toluene and phenol to maleic acid, of benzene and phenol to benzoquinone, of toluene and its substitution products and derivatives to the corresponding aldehydes and acids, of anthracene to anthraquinone, of acenaphthene to acenaphthaquinone, naphthalic anhydride, etc., of phenanthraquinone, etc., of methyl alcohol to formaldehyde, of ethyl alcohol to acetic acid; and the like.

The depreciation or loss in the catalytic activity of a contact mass by use in the catalytic oxidation of an organic compound may be due in part to the presence in the organic substance of certain impurities which are prejudicial to the life of the catalyst. It may be due also in part to the distribution or deposition of carbon or carbonaceous material, such as, for example, difficultly combustible resins, upon the surface and interior of the contact mass thereby partially or completely coating it and diminishing its porosity and capillarity; or it may be due in part to the contact mass itself undergoing chemical alterations such as, for example, the formation of certain oxidation stages or steps such as lower oxidation products of the actual catalyst which are no longer regenerated by the oxygen of the air and consequently a sufficient amount of active oxygen is no longer available for the desired catalysis. Such changes are known to occur particularly in catalysts comprising the oxides, compounds or combinations of the elements of the fifth, sixth and seventh groups of the periodic system; but such changes are not limited to compounds containing elements of these groups. Further, the presence of stabilizers in the contact mass (that is, substances or compounds whose presence stabilizes the catalytic activity of the actual catalyst, such as, for example, salts of the alkali and alkaline earth metals) may suffer chemical changes because of the reducing and other actions of the gaseous organic compounds which are being subjected to catalytic oxidation, and there by their stabilizing influence be partly or completely eliminated.

Attempts have been heretofore made to regenerate or rejuvenate the catalytic activity of depreciated catalysts which are employed in the catalytic oxidation of organic compounds by heating them to high temperatures either alone or in a current of air or oxygen, but such attempts have met with only moderate success and the desired end has not been attained.

This invention contemplates the regeneration of catalysts used in the catalytic oxidation of organic compounds and which have become deteriorated by such use, by treating them with non-metallic acid radicals or groups which are capable of existing as such in the free state, or radicals which with oxygen are capable of giving non-metallic acid radicals or groups existing in the free state, or compounds which contain such radicals or groups, and simultaneously or subsequently treating the catalyst with oxygen containing gases at elevated temperatures (about 200°–550° C.). The non-metallic acid radicals or compounds used must be volatile below red heat (about 550° C.) and for the purpose of this invention volatile compounds which decompose and leave a residue which is not volatile upon treatment with oxygen at elevated temperatures are excluded from the scope of the invention. In the case of some acid radicals which are capable of decomposing with the production of oxygen, such as nitric acid vapors and certain oxides of nitrogen, simultaneous or subsequent treatment with an oxygen containing gas may be omitted. For the regeneration of said deteriorated catalysts, the invention comprises the use, for example, of gases containing sulfur trioxide, or sulfur dioxide and gases containing oxygen or an oxidant, and with or without the addition of small amounts of halogens or volatile non-metallic halogen compounds.

Among the halogen compounds which may be employed are, for example, the halogens, halogen halides, ammonium halides, sulfur chloride, thionyl chloride, sulfuryl chloride, phosgene, halogen substituted organic compounds such as chlorinated aromatic hydrocarbons, acyl halides, ethylene chloride, or bromide; and the like.

Instead of gases containing sulfur dioxide, the halogens or volatile halogen compounds or their mixtures may be used. Further, according to the nature of the contact masses to be regenerated, one may use nitric acid vapors, or gases containing nitrogen oxides either alone or an admixture, or mixed with any of the previously mentioned acid radicals or compounds. It has also been found advantageous in many cases to mix steam with the above mentioned gases or gas mixtures in the regeneration of contact masses.

In carrying out the process, the regenerating agents above mentioned may be passed over and through the catalyst without removing it from the catalytic chamber or, if desired, the catalyst may be removed and then subjected to treatment in any suitable manner. The treatment is continued for periods of time which may vary with different catalyzers and with the degree of increased activity which is desired or which is feasible; and the period of treatment can be readily determined by following the process of the reaction and testing the catalyst for increased activity in any suitable manner, such as, for example, utilizing the catalyzer for carrying out the catalytic oxidations of the organic substance for which it is intended. The process can be carried out under pressures less than, equal to, or greater than atmospheric pressures.

The catalytic activity of regenerated catalysts obtainable by the present invention exceeds in efficiency that which can be obtained by processes as heretofore employed. By the action of said regenerative agents on the deteriorated catayist, the carbon and carbonaceous material is rapidly removed either by combustion or decomposition. Moreover, the reactivating reagents form in many cases more or less easily decomposable compounds with the catalyst proper which upon decomposition loosen the surface of the catalyst and permit it to be rapidly regenerated so that highly active contact masses are thereby obtained.

The following specific examples will further illustrate the invention but it will be understood that the invention is not limited thereto.

*Example 1.*—A contact mass originally containing 100 parts by weight of kieselguhr, 10 parts by weight of silver vanadate and 24 parts by weight of potassium sulfate, and which has become deteriorated by use in the catalytic oxidation of naphthalene for the production of phthalic anhydride at temperatures of about 340°–420° C., is regenerated by mixing sulfur dioxide with the naphthalene-air mixture which is being passed over the catalyst in the contact chambers and continuing the catalytic oxidation process in the regular manner. As soon as the yields of phthalic anhydride becomes substantially normal the further addition of quantities of sulfur dioxide is stopped.

Instead of adding sulfur dioxide to the naphthalene-air mixture during the regular operation of the process, the naphthalene-air mixture can be shut off, and the contact mass then treated first with air and then with gases containing sulfur dioxide and air at about 350°–500° C., and with or without the addition of steam. Or the contact mass after treatment with a current of air can be treated with gases containing sulfur trioxide at temperatures below 200° C. and subsequently with air alone at 350°–500° C. The same effect is obtained if sulfur dioxide is substituted in whole or in part by nitric acid vapors or gases containing oxides of nitrogen and with or without the presence of air or steam at temperatures of from ordinary temperatures to 500° C.

*Example 2.*—A deteriorated contact mass originally comprising 200 liters of pumice of about the size of peas, 29 kg. by weight of iron vanadate and 3 kg. by weight of iron molybdate, and which has been deteriorated in the catalytic oxidation of acenaphthene for the production of naphthalic anhydride, is saturated at ordinary temperatures with chlorine after which it is treated with a current of air at a temperature of about 200° to 500° C. with or without the addition of steam. Or instead of treating the catalyst first with chlorine at ordinary temperatures and then with air at elevated temperatures it may be treated directly with a mixture of chlorine and air, or ethylene dichloride and air, at a temperature of about 300° to 500° C. The catalyst can also be regenerated with substantially the same success by using at elevated temperatures the gases, vapors or compounds, or their mixtures, mentioned in Example 1. The regeneration of the catalyst can be carried out in situ in the contact chamber.

*Example 3.*—A contact mass comprising 220 liters of pumice the size of peas, 20 kgs. of nickel molybdate and 25 kgs. of calcium chloride, and which has been employed in the catalytic oxidation of methyl alcohol to formaldehyde, is treated with a current of air containing nitrosyl chloride at ordinary temperatures for a period of about 2 to 5 hours and then with a current of air alone in order to purge the contact mass and apparatus of nitrosyl chloride. In case the contact mass is contaminated with carbon or carbonaceous matter, the regeneration should be carried out at temperatures of about 300° to 500° C. instead of at room temperature. In this example, phosgene can also be used in place of nitrosyl chloride but the temperature should then be about 200° C. followed by air alone at 400°–500° C.

*Example 4.*—A contact mass prepared by treating 200 liters of ferrosilicon in pieces about the size of a pea with a saturated aqueous solution containing 12 kilograms ammonium vanadate evaporating to dryness while stirring, drying the residue, and finally heating it to about 400°–450° C., and which has become deteriorated by use, in the catalytic oxidation of naphthalene for the production of phthalic anhydride, is subjected to the action of phosgene at a temperature of about 200° C. and then with air at about 400°–500° C.

It is thus seen that according to the present invention the regeneration of contact masses used in the catalytic oxidation of organic compounds can be readily and efficiently effected; and according to the composition of the catalyst a selection of a regenerating agent can be made among the acid anhydrides and their compounds of the character mentioned for appropriate use. It will also be noted that the regeneration of the catalyst can be effected in the catalytic chamber or furnace without removal of the catalyst therefrom and in many cases without even cooling the catalyst or furnace.

In the claims it will be understood that the term "acidogen" includes acid radicals or groups which are capable of existing as such in the free state or radicals which with oxygen are capable of producing non-metallic acid radicals or groups capable of existing as such in the free state, or compounds containing such groups or radicals. It should be understood that the definition includes such anhydrides as $SO_3$, and the like, which behave as acid radicals in the process. Other anhydrides, such as oxides of nitrogen, sulfur dioxide, and the like are included.

I claim:

1. A process of regenerating contact masses which comprises treating contact masses, which have become deteriorated by use in the catalytic oxidation of organic compounds, with an acidogen which is volatile below red heat and which does not leave a residue non-volatile upon treatment with oxygen containing gases at elevated temperatures.

2. A process of regenerating contact masses which comprises treating contact masses, which have become deteriorated by use in the catalytic oxidation of organic compounds, with an oxygen containing gas in the presence of an acidogen which is volatile below red heat and which does not leave a residue non-volatile upon treatment with oxygen containing gases at elevated temperatures.

3. A process of regenerating contact masses which comprises treating contact masses, which have become deteriorated by use in the catalytic oxidation of organic compounds, at an elevated temperature with an acidogen which is volatile below red heat and which does not leave a residue non-volatile upon treatment with oxygen containing gases at an elevated temperature.

4. A process of regenerating contact masses which comprises subjecting contact masses, which have deteriorated by use in the catalytic oxidation of organic compounds, at temperatures ranging from room temperatures to about 550° C. with an acidogen which is volatile below red heat and which does not leave a residue non-volatile when treated with oxygen containing gases at a temperature of about 400° to 500° C.

5. A process of regenerating contact masses which comprises treating contact masses, which have become deteriorated by use in the vapor phase catalytic oxidation of organic compounds, at a temperature of about 200° to 550° C. with an oxygen containing gas in the presence of an acidogen which is volatile at this temperature and which of itself leaves no non-volatile residue under said conditions.

6. A process of regenerating contact masses which comprises treating contact masses, which have become deteriorated by use in the catalytic oxidation of organic compounds, first with an acidogen which is volatile below red heat and which does not of itself leave a residue non-volatile when treated with an oxygen containing gas at elevated temperature and then subsequently treating the contact mass with an oxygen containing gas at a temperature of about 200° to 550° C.

7. The process as claimed in claim 1 in which steam is also used as an added component.

8. A process of regenerating contact masses which comprises treating contact masses, which have become deteriorated by use in the catalytic oxidation of organic compounds, with sulfur dioxide in the presence of oxygen containing gases.

9. The process as claimed in claim 8 when carried out at temperatures of about 200° to 550° C.

10. The process as claimed in claim 8 when carried out at temperatures of about 200° to 550° C. in the presence of steam as an added component.

11. A process of regenerating contact masses which comprises subjecting contact masses, which have become deteriorated by use in the catalytic oxidation of organic substances, to the action of non-metallic acid anhydride components which are normally gaseous at ordinary temperatures.

12. The process as claimed in claim 11 when carried out in the presence of an oxygen containing gas.

13. The process as claimed in claim 11 when carried out at temperatures of about 200° to 550° C. in the presence of an oxygen containing gas.

14. The process as claimed in claim 11 when carried out at temperatures of about 200° to 550° C. in the presence of an oxygen containing gas and of steam.

15. A process of regenerating a contact mass which comprises treating a contact mass containing a vanadium compound, which has become deteriorated by use in the catalytic oxidation of organic compounds, with an acid anhydride substance which is volatile below red heat and which does not have a residue non-volatile upon treatment with an oxygen containing gas at elevated temperatures.

16. A process of regenerating a contact mass which comprises treating contact masses containing a vanadium compound, and which have become deteriorated by use in the catalytic oxidation of organic compounds, with sulfur dioxide in the presence of an oxygen containing gas at a temperature of about 200° to 500° C.

17. A process of regenerating a contact mass which comprises treating a contact mass containing a molybdenum compound, and which has become deteriorated by use in the catalytic oxidation of organic compounds, with an acid anhydride substance which is volatile below red heat and which does not have a residue non-volatile upon treatment with an oxygen containing gas at elevated temperatures.

18. A process of regenerating a contact mass which comprises treating a contact mass containing a vanadium compound, and which has become deteriorated by use in the catalytic oxidation of organic compounds, with an acid anhydride substance which is volatile below red heat and which does not have a residue non-volatile upon treatment with an oxygen containing gas at elevated temperatures.

19. A process of regenerating a contact mass which comprises treating contact masses containing a vanadium compound and a molybdenum compound, and which have become deteriorated by use in the catalytic oxidation of organic compounds, with sulfur dioxide in the presence of an oxygen containing gas at a temperature of about 200° to 550° C.

20. A process of regenerating a contact mass which comprises treating contact masses containing a vanadium compound and a salt of an alkali metal, and which have become deteriorated by use in the catalytic oxidation of organic compounds, with sulfur dioxide in the presence of an oxygen containing gas at a temperature of about 200° to 500° C.

21. A process of regenerating a contact mass which comprises treating a contact mass, containing at least one compound of a metal of any one of the fifth, sixth, seventh and eighth groups of the periodic system and at least one salt of an alkali forming metal, and which has become deteriorated by use in the catalytic oxidation of organic compounds, with an acid anhydride substance which is volatile below red heat and which does not have a residue non-volatile upon treatment with an oxygen containing gas at elevated temperatures.

22. A process of regenerating a contact mass, which comprises treating a contact mass, containing at least one salt of a metal of any one of the fifth, sixth, seventh and eighth groups of the periodic system and at least one salt of an alkali forming metal, and which has become deteriorated by use in the catalytic oxidation of organic compounds, with an acid anhydride substance which is volatile below red heat and which does not have a residue non-volatile upon treatment with an oxygen containing gas at elevated temperatures.

23. Process as claimed in claim 1 when carried out without removal of the contact mass from the catalytic chamber in which the deterioration took place.

Signed at St. Louis, Missouri, this 28th day of July 1925.

ALPHONS O. JAEGER.

CERTIFICATE OF CORRECTION.

Patent No. 1,678,627.  Granted July 24, 1928, to

ALPHONS O. JAEGER.

It is hereby certified that error appears in the printed specification of the above numbered patent requiring correction as follows: Page 1, lines 32 and 33, for the misspelled word "catalyctic" read "catalytic"; line 64, for "suffcr" read "suffer" and line 68, for "there by" read "thereby"; page 2, line 5, for the word "halogen" read "hydrogen" and line 17, for the word "an" read "in"; and that the said Letters Patent should be read with these corrections therein that the same may conform to the record of the case in the Patent Office.

Signed and sealed this 28th day of August, A. D. 1928.

(Seal)

M. J. Moore,
Acting Commissioner of Patents.